United States Patent
Hara et al.

(10) Patent No.: US 7,557,864 B2
(45) Date of Patent: Jul. 7, 2009

(54) VIDEO SIGNAL JUDGMENT CIRCUIT

(75) Inventors: Hideo Hara, Kyoto (JP); Takumi Katoh, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 561 days.

(21) Appl. No.: 10/566,031

(22) PCT Filed: Mar. 2, 2005

(86) PCT No.: PCT/JP2005/004021

§ 371 (c)(1),
(2), (4) Date: Jan. 18, 2006

(87) PCT Pub. No.: WO2005/104538

PCT Pub. Date: Nov. 3, 2005

(65) Prior Publication Data

US 2008/0055480 A1    Mar. 6, 2008

(30) Foreign Application Priority Data

Apr. 19, 2004   (JP)   ............................. 2004-122706

(51) Int. Cl.
*H04N 5/46*   (2006.01)
*H04N 5/10*   (2006.01)
(52) U.S. Cl. ................... 348/558; 348/525; 348/529
(58) Field of Classification Search ......... 348/525–535, 348/553–570
See application file for complete search history.

(56) References Cited

U.S. PATENT DOCUMENTS 4,158,857 A * 6/1979 Hiraguri ............... 348/180
4,319,275 A * 3/1982 Tanaka ................. 348/529
6,108,043 A * 8/2000 White .................. 348/531

FOREIGN PATENT DOCUMENTS

| JP | 01-57866 U | 4/1989 |
| JP | 04-192978 | 7/1992 |
| JP | 05-227483 | 9/1993 |
| JP | 10-210375 | 8/1998 |
| JP | 3064717 U | 9/1999 |
| JP | 2000-324413 | 11/2000 |
| JP | 2003-330445 | 11/2003 |

OTHER PUBLICATIONS

International Search Report for PCT Application No. PCT/JP2005/004021, mailed Jun. 21, 2005.

* cited by examiner

*Primary Examiner*—M. Lee
(74) *Attorney, Agent, or Firm*—Keating & Bennett, LLP (57) ABSTRACT

A video signal judgment circuit for judging the condition of a video signal compounded of a picture signal and a synchronization signal is provided. The video signal judgment circuit is adapted to first filter the video signal by a low-pass filter (LPF) having an adjustable cutoff frequency and then separate the synchronization signal from the filtered signal to provide a pulsed synchronization detection signal. Upon comparison of a detection signal formed on the basis of the synchronization detection signal with an adjustable judgment reference value, the video signal judgment circuit outputs a video signal judgment signal indicative of the condition of the video signal as to whether or not the video signal is nullified or deteriorated.

7 Claims, 5 Drawing Sheets

VIDEO SIGNAL JUDGMENT CIRCUIT

TECHNICAL FIELD

The invention relates to a video signal judgment circuit for judging whether any video signal is available by detecting a synchronization signal of the video signal compounded therein together with a picture signal.

BACKGROUND ART

Image reproduction apparatuses such as VTRs and DVDs are adapted to receive a video signal compounded of a picture signal and a synchronization signal and reproduce the picture signal on a monitor screen.

Without any picture signal, the display screen shows a poor image, which looks like a picture of sandstorm. When the inputted video signal is deteriorated or weakened, noise components become relatively large, which again results in poor "sandstorm" pictures.

A conventional approach to circumvent such poor picture appearing on a display screen is to switch entire picture to a monochromatic blue back screen having a predetermined luminance when no picture signal is available.

In order to perform switching to the blue back screen (the switching hereinafter referred to as blue back processing) in the event that no video signal is available, a synchronization signal detection circuit for detecting the synchronization signal compounded in the inputted video signal is implemented to determine availability of the video signal. In accord with the detection result of the synchronization detection signal, the display screen is switched to a blue back screen (see for example, Japanese Patent Application Laid Open No. H5-227483, which will be hereinafter referred to as Patent Document 1).

The prior art as described in Patent Document 1 determines the existence or non-existence of a video signal using a synchronization signal detection circuit. However, if a video signal is inputted, the blue back screen is preferred to the video signal in the event that the inputted video signal is determined deteriorated. The criteria of determination as to whether the inputted signal is deteriorated or not depend on the type of the inputted video signal (e.g. compound signal or color difference signal) and on the type of the video tuner reproducing the inputted video signal. The prior art circuit disclosed in Patent Documents 1 has a drawback in that it cannot meet these criteria.

It is, therefore, an object of the present invention to provide a video signal judgment circuit for judging the condition of a video signal compounded of a picture signal and a synchronization signal, said circuit capable of judging existence or non-existence (availability) of a video signal and the degree of deterioration thereof, and regulating the criteria of judgment.

DISCLOSURE OF THE INVENTION

A video signal judgment circuit according to one embodiment of the invention for detecting the condition of a video signal compounded of a picture signal and a synchronization signal comprises:

a synchronization separation unit 200 adapted to: filter an inputted video signal with a low-pass filter 10 having a cutoff frequency adjustable by a first control signal; separate a synchronization signal from the filtered video signal VIDF to output a pulsed synchronization detection signal Sh, and a video signal judgment unit 300 adapted to compare a detection signal Vdet formed on the basis of the synchronization detection signal Sh with a judgment reference value that is adjustable by a second control signal and output a judgment signal based on the comparison.

The video signal judgment circuit may include a logic circuit 60 for outputting the first and second control signals to adjust the cutoff frequency and judgment reference value upon receipt of an external instruction signal.

The first and second control signals can be serial data.

The synchronization separation unit 200 may include a low-pass filter 10 having a variable resistor and a capacitor, the resistance of the resistor adjustable by the first control signal to regulate the cutoff frequency of the low-pass filter; and a synchronization separation circuit 20 for separating a synchronization signal from the video signal filtered out with the low-pass filter 10 to output a pulsed synchronization detection signal VIDF.

The video signal judgment unit 300 may include:

a mono-multi circuit 30 that undergoes mono-stable operation in response to the synchronization detection signal Sh to output a mono-multi output signal Vm having a pulse width regulated according to the period of cycle of the synchronization detection signal Sh but stop the mono-multi output signal Vm when no synchronization detection signal is fed in a predetermined period of time Toff+Tm;

a smoothing circuit 40 for smoothing the mono-multi output signal Vm and outputting the smoothed signal as the detection signal Vdet; and a detection judgment comparison circuit 50 including a first comparator 51 for comparing the detection signal Vdet with a first judgment reference value Vrefl adjusted by the second control signal, the detection judgment comparison circuit 51 adapted to output a judgment signal DET based on the comparison made.

The mono-multi circuit 30 may include:

a capacitor 32 chargeable through a charging resistor 31;

a switch element 33 connected in parallel with the capacitor and switched on in accordance with the synchronization detection signal Sh;

a comparator 34 for generating a mono-multi output signal Vm when the voltage of the capacitor exceeds a predetermined voltage; and a time-limit control circuit for stopping the mono-multi output signal Vm when no synchronization detection signal Sh is fed in a predetermined period of time Toff+Tm.

The detection judgment comparison circuit 50 may further include a second comparator 53 for comparing the detection signal Vdet with a second judgment reference value Vrefh higher than the first judgment reference value Vrefl, and the detection judgment comparison circuit 50 is adapted to output the judgment signal DET when the detection signal Vdet exceeds the first judgment reference value Vrefl but is less than the second judgment reference value Vrefh.

The logic circuit 60 and at least those circuits of the synchronization separation unit and the video signal judgment unit that are regulated by the first and second control signals can be integrated in a semiconductor IC.

According to the invention, the cutoff frequency of the low-pass filter of a synchronization separation unit and the judgment reference value of the detection judgment comparison circuit of a video signal judgment unit can be individually regulated by an externally applied control signal after the video signal judgment circuit is fabricated in a semiconductor integrated circuit. Thus, the invention adds flexibility to the judgment of the existence or non-existence as well as deterioration of the video signal inputted according to the type of video signal compounded of a picture signal and a synchronization signal (for example, a compound signal or a color difference signal), and the type of the video tuner reproducing the video signal. Therefore, blue back processing for the display screen can be performed properly.

Since the cutoff frequency of the low-pass filter can be adjusted by an externally applied control signal, it is not necessary to individually establish a proper combination of external parts, or alter the combination thereof, according to the type of the video signal inputted. This broadens the degree of freedom in usage of various video signals.

Although the voltage of the detected signal can fluctuate when it is smoothed according to the magnitude and frequency of the noise in the inputted video signal, operation of the detection judgment comparison circuit can be stabilized irrespective of the noise by properly adjusting the judgment reference value.

BEST MODE FOR CARRYING OUT THE INVENTION

Figure 1:
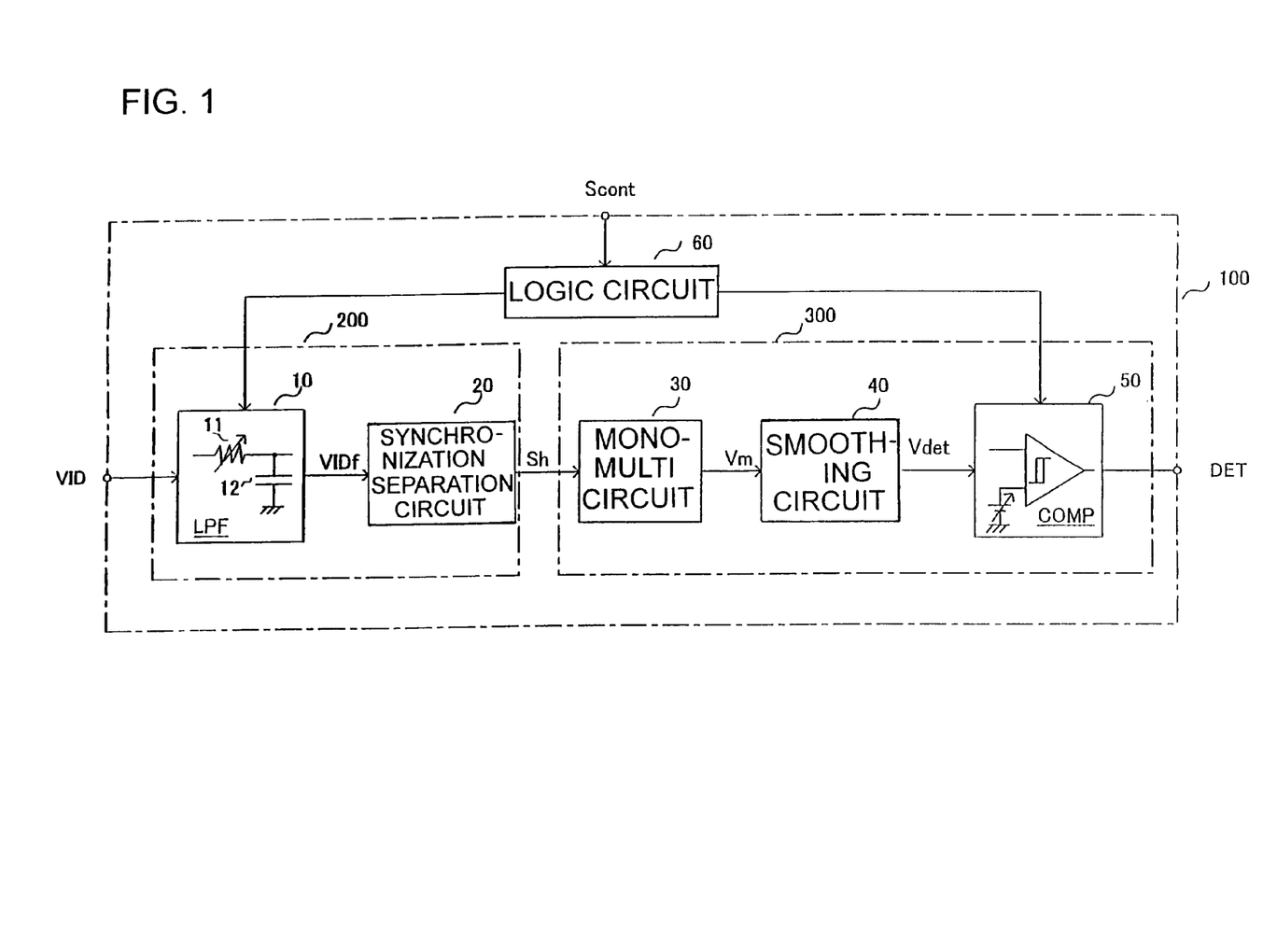
FIG. 1 shows a general arrangement of the video signal judgment circuit according to one embodiment of the invention.
Figure 2:
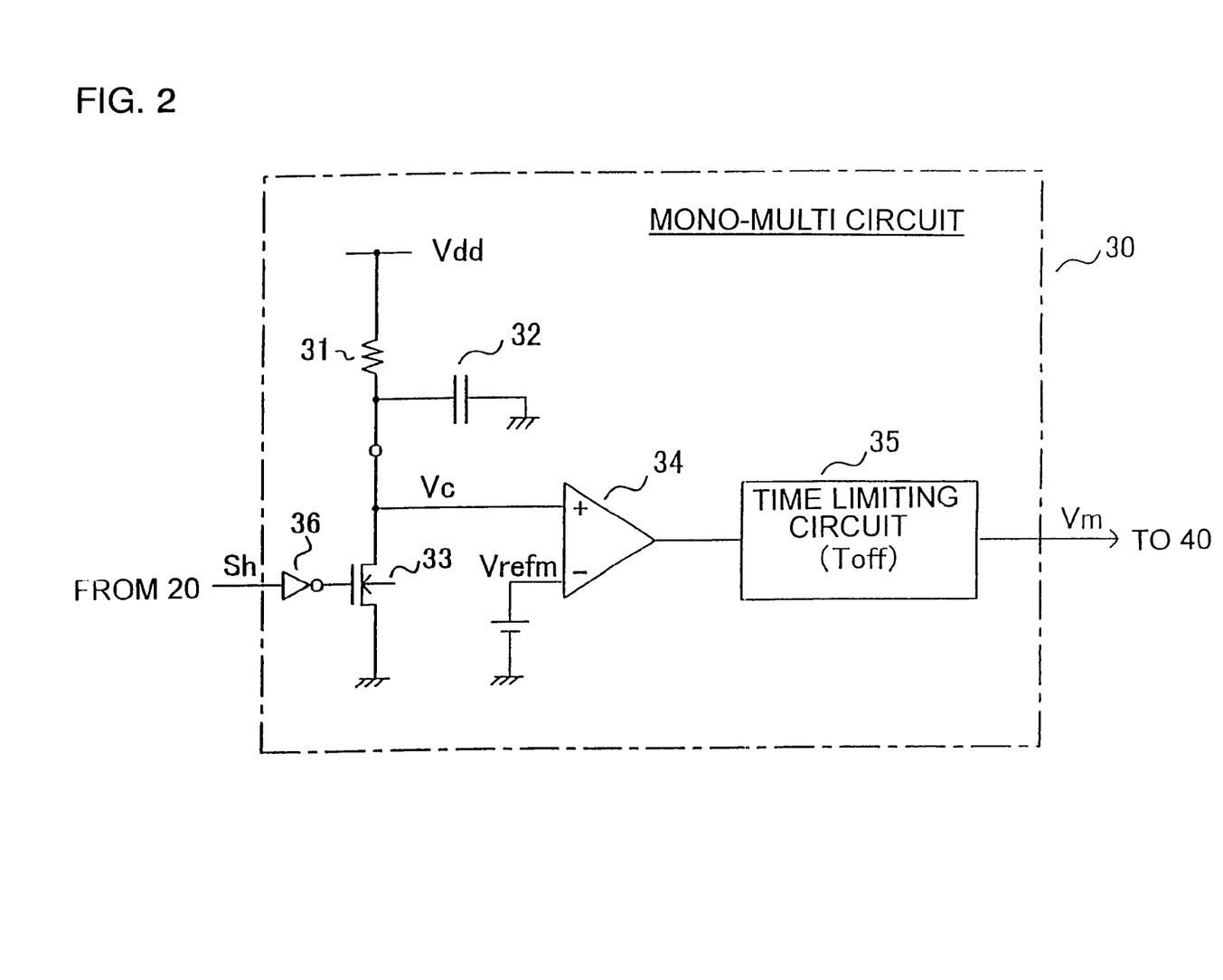
FIG. 2 shows an arrangement of the mono-multi circuit of FIG. 1.
Figure 3:
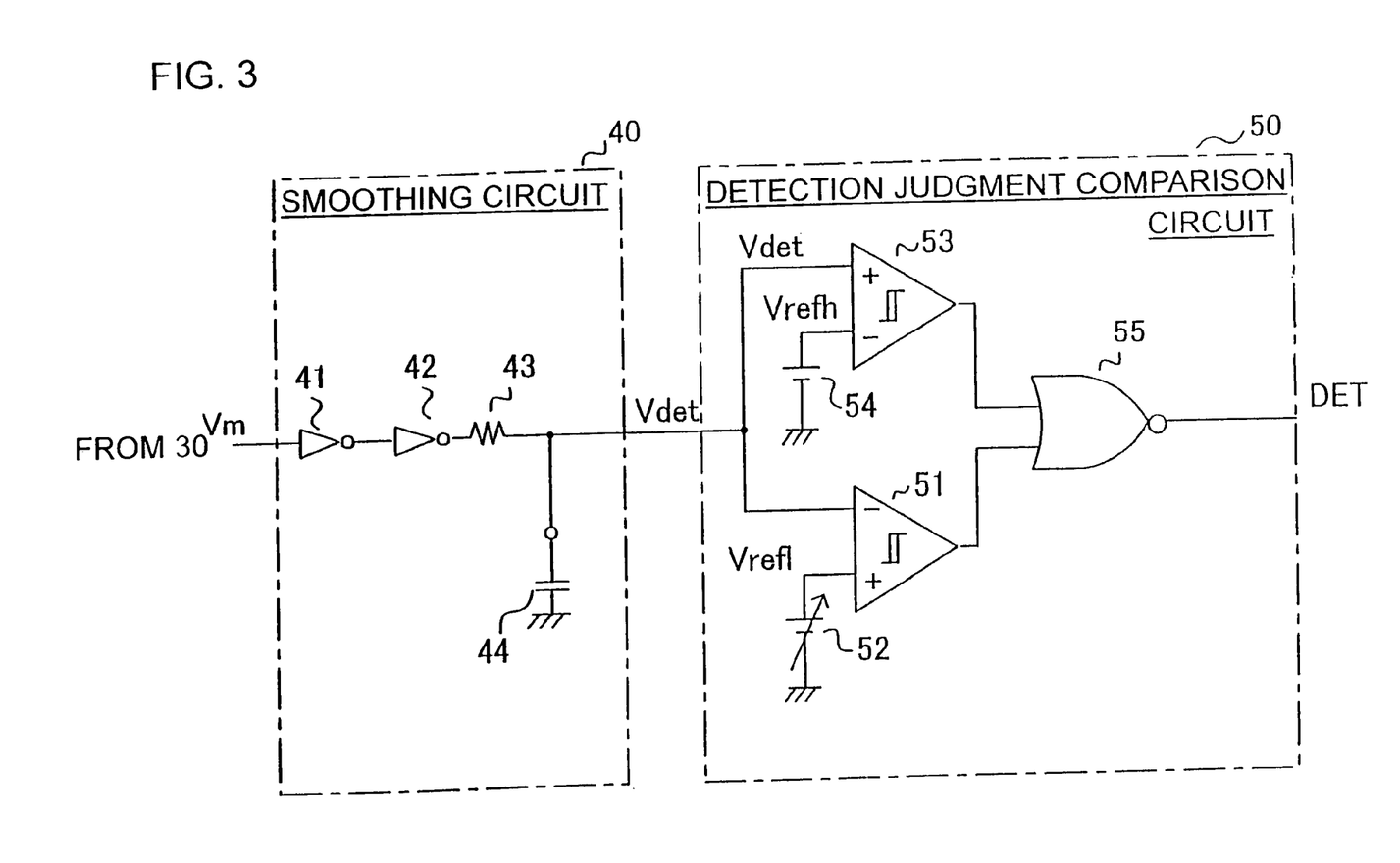
FIG. 3 shows an arrangement of the smoothing circuit and the detection judgment comparison circuit of FIG. 1.

An inventive video signal judgment circuit will now be described in detail by way of example with reference to the accompanying drawings. Referring to FIG. 1, there is shown a general arrangement of a video signal judgment circuit according to one embodiment of the invention. FIG. 2 shows an arrangement of a mono-multi circuit of the video signal judgment circuit. FIG. 3 shows arrangements of a smoothing circuit and a detection judgment comparison circuit of the video signal judgment circuit.

The video signal judgment circuit of FIG. 1 is fabricated in a semiconductor integrated circuit (IC) 100. However, capacitors having large capacitances and some other parts can be provided as external parts.

A video signal VID inputted into the IC 100 is compounded of a picture signal and a synchronization signal superposed on the picture signal. The video signal VID is supplied from, for example, an image reproduction apparatuses such as a VTR and a DVD-R. As is well known, the polarity of the synchronization signal is inverted with respect to a certain level of the picture signal.

There are various types of video signals VID such as a compound signal and a color difference signal, and various video signals having different characteristics adapted for respective video tuners reproducing the video signals. It is, therefore, desirable for a video signal judgment circuit to be capable of properly judging the condition (e.g. degree of degradation) of a video signal in accordance with the type of the video signal.

A low-pass filter (hereinafter referred to as LPF) 10 has a predetermined cutoff frequency fcut to cut off (or attenuate) high frequency components of the video signal VID, passing low-frequency components. The cutoff frequency fcut may be regulated by a first control signal supplied from a logic circuit 60. Considering a possibility that the LPF 10 is fabricated in an IC, the LPF 10 is formed of a variable resistor 11 and a capacitor 12.

A synchronization separation circuit 20 is fed with a video signal VIDf that has been filtered by the LPF 10, separates the synchronization signal compounded in the video signal VIDf by distinguishing the amplitude of the synchronization signal, and outputs the separated synchronization signal in the form of a pulsed synchronization detection signal Sh.

This pulsed synchronization detection signal Sh contains noise pulses in addition to the original synchronization signal compounded in the video signal VID. The noise pulses result from the noise pulses contained in the video signal VID and falsely detected as synchronization signal. This can often happen when, for example, the video signal VID is reproduced from a weak airwave received. When the synchronization detection signal Sh contains noise pulses, the apparent pulse interval (i.e. period of cycle of the pulses) of the synchronization detection signal Sh becomes shorter than its true pulse interval.

In a special case, noise of opposite phase relative to the video signal VID is superposed on the video signal VID. In that case, it appears as if the no noise existed and a synchronization signal had a longer period of cycle than the true period of cycle. In this case, therefore, the apparent pulse interval of the synchronization detection signal Sh is longer than the true pulse interval of the original synchronization signal.

Further, when no video signal VID is inputted into the LPF 10, or when the level of the inputted video signal VID is very low, it is likely that no synchronization detection signal Sh is outputted from the synchronization separation circuit 20 in a predetermined period of time. Thus, there can be a case where no synchronization detection pulse is generated as well as a case where the pulse interval of the synchronization detection signal Sh becomes shorter or longer.

In this way, the synchronization detection signal Sh, outputted from the synchronization separation unit 200 consisting of the LPF 10 and the synchronization separation circuit 20, can take on different states. A video signal judgment unit 300 is provided to determine the state of the synchronization detection signal Sh and generate a judgment signal DET to perform blue back processing, as needed. The video signal judgment unit 300 includes a mono-multi circuit 30, a smoothing circuit 40, and a detection judgment comparison circuit 50.

FIG. 2 shows an arrangement of the mono-multi circuit 30 of the video signal judgment unit 300. The mono-multi circuit 30 has a capacitor 32 and a resistor 31 connected in series between a power supply voltage Vdd and the ground, so that the capacitor 32 is charged and discharged via the resistor 31. The node of the resistor 31 and the capacitor 32 is connected to the ground via a switch 33. This switch 33 is switched on in response to the synchronization detection signal Sh generated by, and supplied from, the synchronization separation circuit 20.

In the example shown herein, the switch 33 is a NMOS transistor, so that the synchronization detection signal Sh is supplied to the gate of the transistor via an inverter 36. Of course, the switch 33 can be another type of switch element such as a bipolar transistor. The inverter 36 is used here on the assumption that each pulse of the synchronization detection signal Sh supplied thereto is a falling pulse. Therefore, if each of the synchronization detection signals Sh is a rising pulse, the inverter 36 is omitted.

The charge voltage Vc of the capacitor 32 rises until the switch 33 turns on, when the voltage Vc drops to zero voltage. The charge voltage Vc is compared with a mono-multi reference voltage Vrefm by a comparator 34. As the charge voltage Vc grows from zero voltage and exceeds the reference voltage Vrefm during a mono-stable period Tm, the comparator 34 generates an output voltage (referred to as comparison output). This comparison output is passed through a time-limit control circuit 35 and supplied as a mono-multi output signal Vm to the smoothing circuit 40.

The time-limit control circuit 35 generates a mono-multi output signal Vm in concurrent with the generation of the comparison output by the comparator 34, and stops the mono-multi output signal Vm when the comparison output of the comparator 34 lasts longer than a check period Toff. That is, when the comparison output of the comparator 34 turns out to be a pulse that last shorter than the check time Toff, it is passed through the time-limit control circuit 35 as it is, and outputted as the mono-multi output signal Vm. However, when the comparison output of the comparator 34 lasts longer than the check time Toff, the mono-multi output signal Vm is stopped when the check time Toff has elapsed. Incidentally, the condition of the mono-multi output signal Vm being stopped can be made self-sustainable.

In the example shown in FIG. 2, the mono-multi circuit is adapted to stop outputting the mono-multi output signal Vm when the comparison output of the comparator 34 lasts the check time Toff. Alternatively, the mono-multi output signal Vm may be stopped at the time when, upon monitoring the synchronization detection signal Sh (or another equivalent signal), no synchronization detection signal Sh is inputted in a predetermined period Toff+α, where α is a certain arbitrary period. α can be equal to the mono-stable time Tm.

In the example shown herein, the resistor 31 and the capacitor 32 are provided in the form of external discrete parts of the IC 100. Thus, the mono-stable time of the mono-multi circuit 30 can be altered by changing the external resistor 31 and/or the capacitor 32. However, the resistor 31 and the capacitor 32 can be formed in the IC 100 together with other circuits.

Referring to FIG. 3, there is shown arrangements of the smoothing circuit 40 and the detection judgment comparison circuit 50 of the video signal judgment unit 300.

The smoothing circuit 40 has a smoothing resistor 43 and a smoothing capacitor 44, which are connected to two serially connected inverters 41 and 42. In the smoothing circuit 40, the mono-multi output signal Vm is smoothed before it is outputted as a DC detection voltage Vdet. The magnitude of the detection voltage Vdet is proportional to the duty ratio of the mono-multi output signal Vm, which is defined to be the ratio, [high (H) level period]/[H level period+low (L) level period] of the mono-multi output signal Vm.

The inverters 41 and 42 are a PMOS transistor and a NMOS transistor, respectively, each connected between the power supply voltage Vdd and the ground. In the example shown, the smoothing capacitor 44 is provided outside the IC 100. However, like other elements, the smoothing capacitor 44 can be formed in the IC 100.

The detection judgment comparison circuit 50 has a first comparator 51, a second comparator 53, and a NOR circuit 55 for receiving the outputs of these comparators 51 and 53.

The first comparator 51 compares the detection voltage Vdet with a low judgment reference value (first judgment reference value) Vrefl supplied from a first reference voltage source 52. The first comparator 51 generates a comparison output of L level when the detection voltage Vdet is higher than the first judgment reference value Vrefl. The first judgment reference value Vrefl is regulated by a second control signal supplied from a logic circuit 60.

The second comparator 53 compares the detection voltage Vdet with a high judgment reference value (second judgment reference value) Vrefh supplied from a second reference voltage source 54 (Vrefh>Vrel). The second comparator 53 generates a comparison output of L level when the detection voltage Vdet is lower than the second judgment reference value Vrefh. The second judgment reference value Vrefh need not be variable, so that it can be fixed to a predetermined level. Of course, the second judgment reference value Vrefh can be made adjustable by a control signal supplied from the logic circuit 60, as needed.

In order to allow for stable operation of the first and second comparators 51 and 53 detecting the detection voltage Vdet, it is preferably for these comparators to have a hysteresis characteristic of a predetermined width.

The NOR circuits 55 generate an output of H level when both of the comparison outputs from the first and second comparators 51 and 53 have L level. When either one of the comparison outputs from the first and second comparators 51 and 53 has H level, the NOR circuit 55 generates an output of L level.

When an output of L level is generated from the NOR circuit 55 of the detection judgment comparison circuit 50, it implies in the judgment made that no video signal is inputted or that degradation of the inputted signal is severe. On the other hand, when an output of H level is generated from the detection judgment comparison circuit 50, it implies that a permissible video signal has been supplied. The judgment signal DET outputted from the detection judgment comparison circuit 50 is supplied to a display control circuit (not shown). This judgment signal DET can be used in the blue back processing for the display screen.

Referring again to FIG. 1, it is shown that the logic circuit 60 is formed in the IC 100 together with the synchronization separation unit 200 and the video signal judgment unit 300. The logic circuit 60 receives a command signal Scont from outside the IC 100. The logic circuit 60 supplies the LPF 10 with a first control signal for regulating the cutoff frequency fcut, and supplies the detection judgment comparison circuit 50 with a second control signal for regulating its judgment reference value (particularly the first judgment reference value Vrefl).

Since the command signal Scont and the first and second control signals are implemented to regulate the cutoff frequency fcut and the first judgment reference value Vrefl, these signals need not be supplied at high speeds. Therefore, in order to reduce the number of external connection terminals and internal lead wires of the IC 100, these signals are preferably supplied in the form of serial data.

Referring to characteristics diagrams shown in FIGS. 4-7, operation of the invention will now be described in detail below. First, in accordance with the characteristics of, for example, the video tuner that would be used, the cutoff frequency fcut of the LPF 10 and the first judgment reference value Vrefl of the detection judgment comparison circuit 50 are set to predetermined values. This setting is carried out by the first and second control signal received from the logic circuit 60.

The video signal VID reproduced by the video tuner, say, is inputted into the LPF 10. The video signal VID contains noise components of various magnitudes and frequencies, which are superposed on the picture signal and the synchronization signal. High frequency components of the noise are removed or attenuated by the LPF 10. A pulsed synchronization detection signal Sh is outputted from the synchronization separation circuit 20. The mono-multi circuit 30 provides a mono-multi output signal Vm in accord with the synchronization detection signal Sh.

Figure 4:
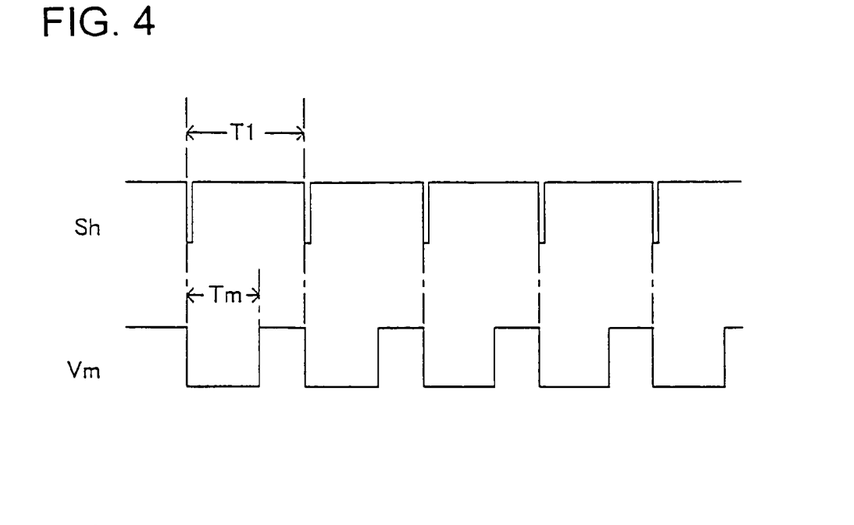
FIG. 4 shows an exemplary mono-multi output signal Vm in response to a synchronization detection signal Sh.
Figure 5:
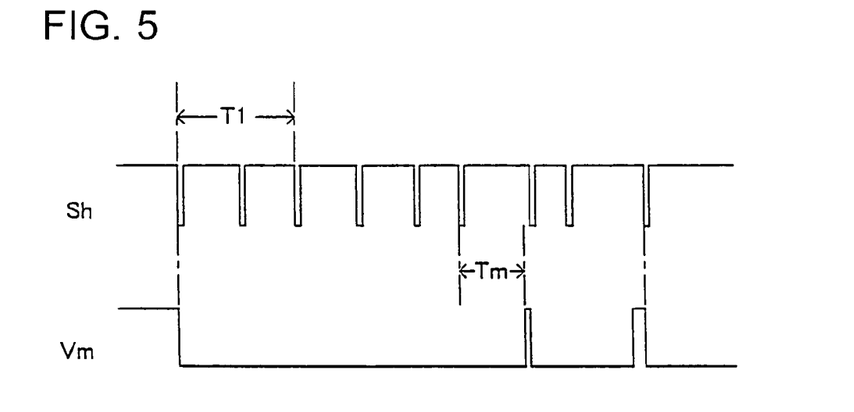
FIG. 5 shows another exemplary mono-multi output signal Vm in response to a synchronization detection signal Sh.
Figure 6:
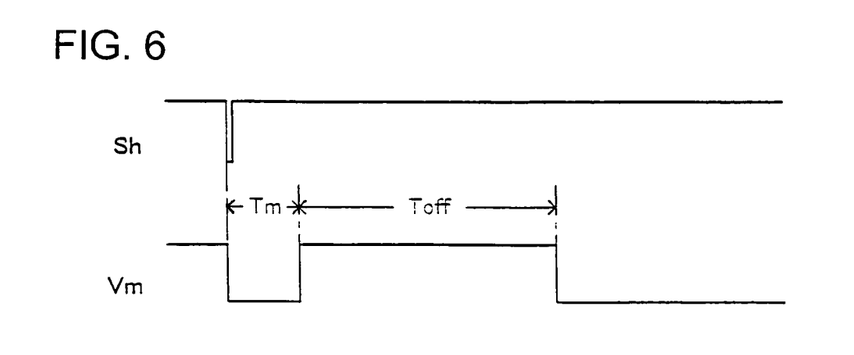
FIG. 6 shows a still another exemplary mono-multi output signal Vm in response to a synchronization detection signal Sh.

FIGS. 4-6 illustrate mono-multi output signals Vm generated in response to the synchronization detection signal Sh having different states.

Particularly, FIG. 4 illustrates a case where the synchronization detection signal Sh contains only the true synchronization signal (that is, the video signal VID is in good condition). It is seen in FIG. 4 that the synchronization detection signal Sh occurs with the same period of cycle T1 as the period of cycle of the original synchronization signal. Similarly, the mono-multi output signal Vm falls in synchronism with the fall of the synchronization detection signal Sh, and goes high when a mono-stable time Tm of the mono-multi circuit 30 has passed. As a consequence, a pulsed mono-multi output signal Vm is outputted for a period of time that equals the period of cycle T1 minus the mono-stable period Tm (T1−Tm).

This mono-multi output signal Vm, when smoothed by the smoothing circuit 40, results in a detection voltage Vdet between the first judgment reference value Vrefl and the second judgment reference value Vrefh, so that no judgment signal DET of L level will be outputted from the detection judgment comparison circuit 50. That is, the judgment signal DET remains at H level.

FIG. 5 illustrates a case where the video signal VID is reproduced from a weak airwave (having a weak electric field) (that is, the video signal VID is deteriorated). When such deteriorated video signal is inputted, the apparent pulse interval of the synchronization detection signal Sh becomes shorter than the original pulse interval T1 of the true synchronization signal. In other words, noise pulses are included within the original pulses of the synchronization signal.

It is seen in FIG. 5 that the mono-multi output signal Vm falls to zero level at a falling edge of the synchronization detection signal Sh, which again falls before the mono-stable time Tm elapses, so that the mono-multi output signal Vm remains at zero level. If the mono-multi output signal Vm, that has fallen to zero level at the falling edge of the synchronization detection signal Sh, is pulled up only after a mono-stable time Tm has passed, duration of the high level mono-multi output signal Vm is short.

In the instance shown in FIG. 5, the detection voltage Vdet remains at zero volt or at a level lower than the first judgment reference value Vrefl. As a consequence, the judgment signal DET outputted from the detection judgment comparison circuit 50 will be at L level. This judgment signal DET of L level can be used as a basis for the blue back processing of the display screen.

FIG. 6 concerns a case where no video signal VID or only a prominantly low level of video signal VID is supplied. In this case, a synchronization detection signal Sh is not outputted from the synchronization separation circuit 20 for a period longer than a predetermined period (which equals Tm+Toff in the example shown).

As shown in FIG. 6, the mono-multi output signal Vm falls to zero level at a falling edge of a synchronization detection signal Sh, returns to H level after a mono-stable time Tm has passed, and is then falls to zero level a predetermined period (Tm+Toff) after the fall of the synchronization detection signal Sh.

In the instance shown in FIG. 6, the mono-multi output signal Vm remains at H level during the check time Toff, but thereafter remains at zero level. As a consequence, the detection voltage Vdet remains below the first judgment reference value Vrefl. Thus, in this case also, the detection judgment comparison circuit 50 will output a judgment signal DET at L level. Based on this L level judgment signal, the display screen can be processed for the blue back.

There is a further special case (not shown) where noise is superposed on the synchronization signal of the video signal VID in opposite phase. In this case, it appears as if no noise appeared and the synchronization signal had a longer period of cycle than the true period of cycle. As an example, when the pulses of the original synchronization signal are alternately masked by noise pulses, the detection voltage Vdet will be more than twice the ordinary level.

In order to cope with such situations, the detection judgment circuit 50 of the invention is provided with a second comparator 53. Thus, when the detection voltage Vdet detected by the second comparator 53 is higher than the second judgment reference value Vrefh, the detection judgment comparison circuit 50 will output a judgment signal DET at L level. Again, the display screen can be processed for the blue back based on this judgment signal.

Figure 7:
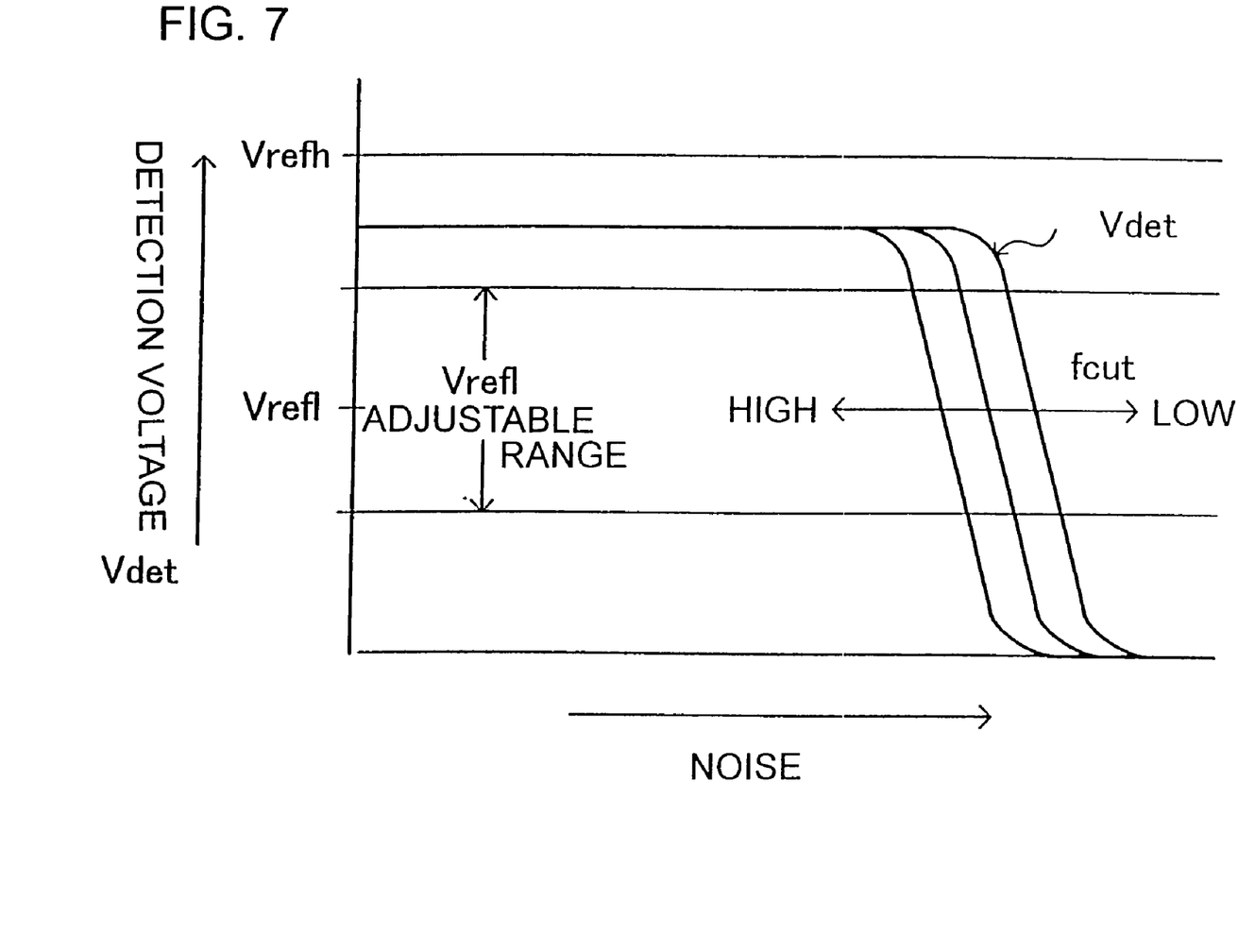
FIG. 7 is a graph showing a noise-detection voltage characteristic of an inventive video signal judgment circuit.

FIG. 7 shows the noise vs. detection voltage characteristic of the inventive video signal judgment circuit. FIG. 7 shows the noise vs. detection voltage characteristic in relation to the adjustable range of the cutoff frequency fcut of the LPF 10, along with the adjustable range of the first judgment reference value Vrefl of the first comparator 51.

Referring to FIG. 7, it is seen that when the noise involved is sufficiently small, the video signal judgment circuit undergoes the same operation as described above in connection with FIG. 4, with the detection voltage Vdet lying between the second judgment reference value Vrefh and the first judgment reference value Vrefl. When the noise is large, the circuit undergoes the same operation as described in connection with FIG. 5, with the resultant detection voltage Vdet being smaller than the first judgment reference value Vrefl. However, in the event that the noise has an intermediate level between those of FIGS. 4 and 5, the detection voltage Vdet varies with the magnitude of the noise with a constant rate (inclination) that depends on the magnitude of the noise.

Thus, as seen in FIG. 7, in this case a small change in the noise level entails a large variation in the detection voltage Vdet. This implies that the noise makes the judgment signal DET unstable, which results in an adverse influence on the blue back processing of the display screen.

In the present invention, the cutoff frequency fcut of the LPF 10 and the first judgment reference value Vrefl of the detection judgment comparison circuit 50 can be individually regulated by an externally supplied command signal Scont using the logic circuit 60.

By lowering the cutoff frequency fcut, the rising point of the detection voltage Vdet can be shifted to a higher noise level. Conversely, by increasing the cutoff frequency fcut, the rising point of the detection voltage Vdet can be shifted to a lower noise level.

Further, by regulating the magnitude of the first judgment reference value Vrefl within a predetermined range, the critical noise level at which the judgment signal DET is outputted can be changed.

In accordance with the embodiment of the invention as described above, a procedure of regulating the first judgment reference value Vrefl and the cutoff frequency fcut will now be described for an arbitrary video signal VID inputted from an arbitrary video tuner. As an example, the cutoff frequency fcut is first varied by an arbitrary magnitude in one direction or another while confirming the condition of the display screen showing the video signal. Next, the magnitude of the first judgment reference value Vrefl is varied in one direction or another. Then, the cutoff frequency fcut is finely adjusted by an arbitrary magnitude in one direction. Through such adjustments, the critical point (frequency) at which the judgment signal DET is properly outputted is established.

It should be appreciated that external application parts can be reduced in number by implementing the built-in LPF 10 in the IC 100. It should be also appreciated that the adjustment of the cutoff frequency fcut of the LPF 10 by an external control signal facilitates simplified regulation of the relative magnitude of noise in the extracted synchronization detection signal Sh.

It should be also appreciated that the cutoff frequency fcut of the LPF 10, and the first judgment reference value Vrefl of the detection judgment comparison circuit 50 can be regulated by an external signal even after manufacturing the IC 100. Thus, the invention offers greater freedom in the use of an arbitrary video signal VID inputted.

When the detection voltage Vdet fluctuates due to noise that fluctuates in magnitude and frequency in the inputted video signal VID, the first judgment reference value Vrefl of the detection judgment comparison circuit 50 can be changed so that the judgment signal DET can be detected in a stable manner.

INDUSTRIAL APPLICABILITY

By detecting the synchronization signal compounded in a video signal, the video signal judgment circuit of the invention detects the existence, or non-existence, of the video signal as well as the condition of the video signal received from an image reproduction apparatus such as a VTR and a DVD, thereby avoiding a poor display screen from appearing on a monitor.

The invention claimed is:

1. A video signal judgment circuit arranged to detect the condition of a video signal compounding a picture signal and a synchronization signal comprising:
   a synchronization separation unit adapted to:
      filter an inputted video signal with a low-pass filter having a cutoff frequency adjustable by a first control signal; and
      separate a synchronization signal from the filtered video signal to output a pulsed synchronization detection signal; and
   a video signal judgment unit adapted to compare a detection signal formed on the basis of said synchronization detection signal with a judgment reference value that is adjustable by a second control signal and output a judgment signal based on the comparison; wherein
   said video signal judgment unit includes:
      a mono-multi circuit that undergoes mono-stable operation in response to said synchronization detection signal to output a mono-multi output signal having a pulse width regulated according to the period of cycle of said synchronization detection signal but stop said mono-multi output signal when no synchronization detection signal is fed in a predetermined period of time;
      a smoothing circuit arranged to smooth said mono-multi output signal and to output the smoothed signal as said detection signal; and
      a detection judgment comparison circuit including a first comparator arranged to compare said detection signal with a first judgment reference value adjusted by said second control signal, said detection judgment comparison circuit adapted to output a judgment signal based on the comparison made.

2. The video signal judgment circuit according to claim 1, further including a logic circuit arranged to output said first and second control signals to adjust said cutoff frequency and judgment reference value upon receipt of an external instruction signal.

3. The video signal judgment circuit according to claim 2, wherein each of said first and second control signals has a serial data form.

4. The video signal judgment circuit according to claim 1, wherein said synchronization separation unit includes:
   a low-pass filter having a variable resistor and a capacitor, the resistance of said resistor adjustable by said first control signal to regulate said cutoff frequency of said low-pass filter; and
   a synchronization separation circuit arranged to separate a synchronization signal from said video signal filtered out with said low-pass filter to output a pulsed synchronization detection signal.

5. The video signal judgment circuit according to claim 1, wherein said mono-multi circuit includes:
   a capacitor chargeable through a charging resistor;
   a switch element connected in parallel with said capacitor and switched on in accordance with said synchronization detection signal;
   a comparator arranged to generate a mono-multi output signal when the voltage of said capacitor exceeds a predetermined voltage; and
   a time-limit control circuit arranged to stop said mono-multi output signal when no synchronization detection signal is fed in a predetermined period of time.

6. The video signal judgment circuit according to claim 1, wherein said detection judgment comparison circuit further includes a second comparator arranged to compare said detection signal with a second judgment reference value higher than said first judgment reference value, said detection judgment comparison circuit adapted to output said judgment signal when said detection signal exceeds said first judgment reference value but is less than said second judgment reference value.

7. The video signal judgment circuit according to claim 2, wherein said logic circuit and at least those circuits of said synchronization separation unit and said video signal judgment unit that are regulated by said first and second control signals of said logic circuit are integrated in a semiconductor IC.

\* \* \* \* \*